United States Patent [19]
Cross

[11] Patent Number: 5,337,058
[45] Date of Patent: Aug. 9, 1994

[54] FAST SWITCHING POLARIZATION DIVERSE RADAR ANTENNA SYSTEM

[75] Inventor: John H. Cross, Weston, Conn.

[73] Assignee: United Technologies Corporation, Hartford, Conn.

[21] Appl. No.: 49,096

[22] Filed: Apr. 16, 1993

[51] Int. Cl.⁵ .............................................. G01S 13/00
[52] U.S. Cl. .................................. 342/188; 343/753; 343/756
[58] Field of Search ................. 342/188; 343/753, 756

[56] References Cited

U.S. PATENT DOCUMENTS

| | | | |
|---|---|---|---|
| 3,569,974 | 3/1971 | McLeod, Jr. | 343/754 |
| 3,656,165 | 4/1972 | Walter et al. | 343/754 |
| 3,701,160 | 10/1972 | Beguin | 343/755 |
| 3,708,796 | 1/1973 | Gilbert | 343/754 |
| 3,720,947 | 3/1973 | Meyer et al. | 343/756 |
| 3,754,271 | 8/1973 | Epis | 343/756 |
| 3,795,914 | 3/1974 | Pickles | 343/756 |
| 3,805,268 | 4/1974 | Britt | 343/756 |
| 3,852,762 | 12/1974 | Henf et al. | 343/757 |
| 3,972,043 | 7/1976 | Locus | 343/18 B |
| 3,988,732 | 10/1976 | Brickey | 343/100 |
| 4,119,932 | 10/1978 | Bochrath | 333/21 |
| 4,472,717 | 9/1984 | Eaves et al. | 343/5 SA |
| 4,568,943 | 2/1986 | Bowman | 343/756 |
| 4,663,634 | 5/1987 | Fulton | 343/756 |
| 4,901,086 | 2/1990 | Smith | 343/909 |
| 4,965,868 | 10/1990 | Wong et al. | 343/756 |
| 5,055,805 | 10/1991 | Kan | 333/21 |
| 5,086,301 | 2/1992 | English et al. | 342/188 |
| 5,128,637 | 7/1992 | Nisbet et al. | 333/24.3 |
| 5,153,601 | 10/1992 | Milne | 343/754 |
| 5,258,768 | 11/1993 | Smith | 343/756 X |

OTHER PUBLICATIONS

Skolnick, Merrill I., "Introduction to Radar Systems", McGraw-Hill Book Company, p. 436.

Primary Examiner—Mark Hellner
Attorney, Agent, or Firm—Patrick J. O'Shea

[57] ABSTRACT

A fast switching, variably polarized lens is placed in front of a radar antenna which radiates an electromagnetic wave having any fixed polarization. The radiated electromagnetic wave is coupled to the lens and the switching elements within the lens transform the polarization of the radiated electromagnetic wave as commanded. Each transmit pulse may take on any polarization which the lens is capable of providing independent of the polarization of the previous transmit pulse. Similarly, during receive mode the lens can be set up to allow the radar system to receive a return signal of any polarization independent of the polarization of the return signal's associated transmit signal.

8 Claims, 4 Drawing Sheets

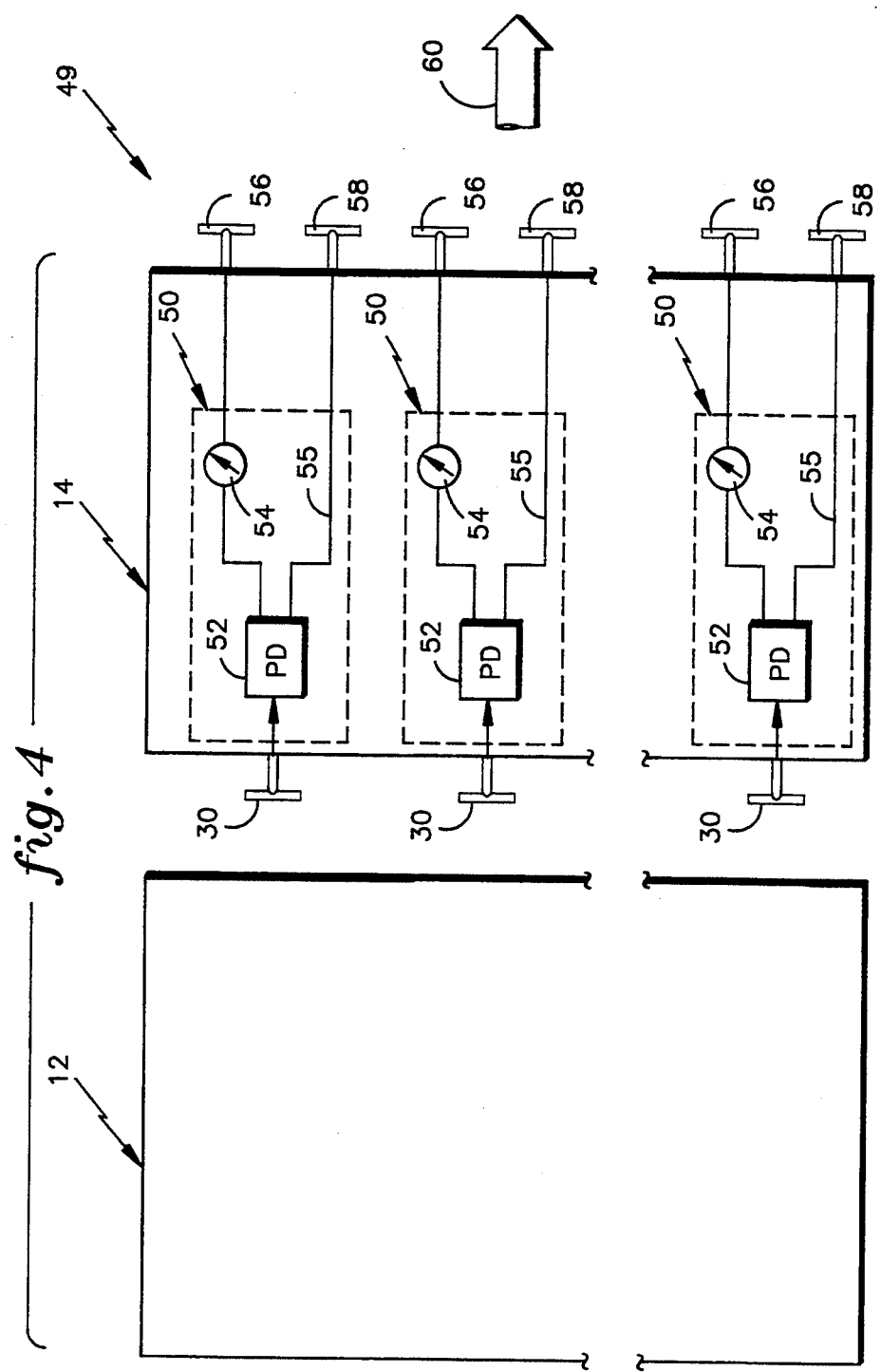
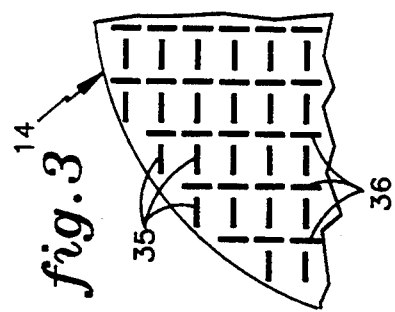

FAST SWITCHING POLARIZATION DIVERSE RADAR ANTENNA SYSTEM

TECHNICAL FIELD

This invention relates to a polarization diverse radar antenna system and more particularly to a system capable of switching the polarization of the radiated and received electromagnetic pulses on a pulse to pulse basis.

BACKGROUND ART

In the field of radar design there is an ever existing emphasis on increasing both the detection and identification capability of the radar. This has lead to designs utilizing narrower and narrower pulses of transmitted electromagnetic energy to break out more features (i.e., increase the resolution) associated with a target. However, narrow pulse systems are prohibitively expensive, especially baseband pulse systems.

One solution which increases the radar system's detection capability utilizes a polarization diverse antenna systems capable of transmitting and receiving pulses of various polarizations. In practice however, these systems are often very complex, unacceptably heavy and physically too large for use in airborne applications. As an example, U.S. Pat. No. 3,720,947 assigned to the United States government discloses a mechanical switching system for changing the polarization of a radar antenna to either a linear, circular right or circular left polarization. This mechanical switching system is not compatible with recent requirements for airborne radar systems, especially a fighter aircraft radar system. In addition, the mechanical switching system is too slow to allow a radar system to switch polarization on a pulse to pulse basis.

One way to provide a polarization diverse radar system is to provide a lens in front of a radar antenna to switch the polarization of the radiated and received electromagnetic waveform to the desired polarization. U.S. Pat. No. 4,901,086 assigned to the Raytheon Company discloses a radar system incorporating a lens which transforms a linearly polarized waveform to a circularly polarized waveform on transmit, and transforms a circularly polarized waveform to a linearly polarized waveform on receive. However, this system does not have the flexibility to vary the polarization of the transmit and receive waveforms on demand, or pulse to pulse.

DISCLOSURE OF THE INVENTION

An object of the present invention is to provide a polarization diverse radar system.

Another object of the present invention is to provide a radar system which can rapidly switch the polarization of the radiated electromagnetic wave.

Yet another object of the present invention is to provide a system which can switch the polarization of the radiated electromagnetic wave on a pulse to pulse basis.

A further object of the present invention is to provide a lens which can be placed in front of an existing radar antenna aperture and switch the polarization of the radiated electromagnetic wave on a pulse to pulse basis.

Another object of the present invention is to provide a lens which can be placed in front of an existing radar antenna aperture and switch the polarization of the received electromagnetic wave on a pulse to pulse basis.

Still another object of the present invention is to provide high isolation between the orthogonal components of the radiated and received pulses.

According to the present invention a fast switching, variably polarized lens is placed in front of a radar antenna which radiates and receives an electromagnetic wave having any fixed polarization, the radiated electromagnetic wave is coupled to the lens and switching elements within the lens transform the polarization of the radiated electromagnetic wave as commanded while providing high isolation between the orthogonal components of the radiated electromagnetic wave.

Each transmit pulse may take on any polarization which the lens is capable of providing independent of the polarization of the previous transmit pulse. Similarly, during receive mode the lens can be set up to allow the radar system to receive a return signal of any polarization independent of the polarization of the return signal's associated transmit signal.

An advantage of the present system is that a polarization diverse antenna system provides improved target definition data due to the enhanced return information provided by the diverse polarization return signals.

These and other objects, features and advantages of the present invention will become more apparent in light of the following detailed description of a preferred embodiment thereof, as illustrated in the accompanying drawings.

BRIEF DESCRIPTION OF THE DRAWINGS

FIG. 3 illustrates the horizontal and vertical radiating elements in a front view of the lens assembly;

FIG. 4 illustrates a cut-a-away side view of an alternative embodiment of a polarization diverse antenna system having variable value phase shifters;

BEST MODE FOR CARRYING OUT THE PRESENT INVENTION

Figure 1:
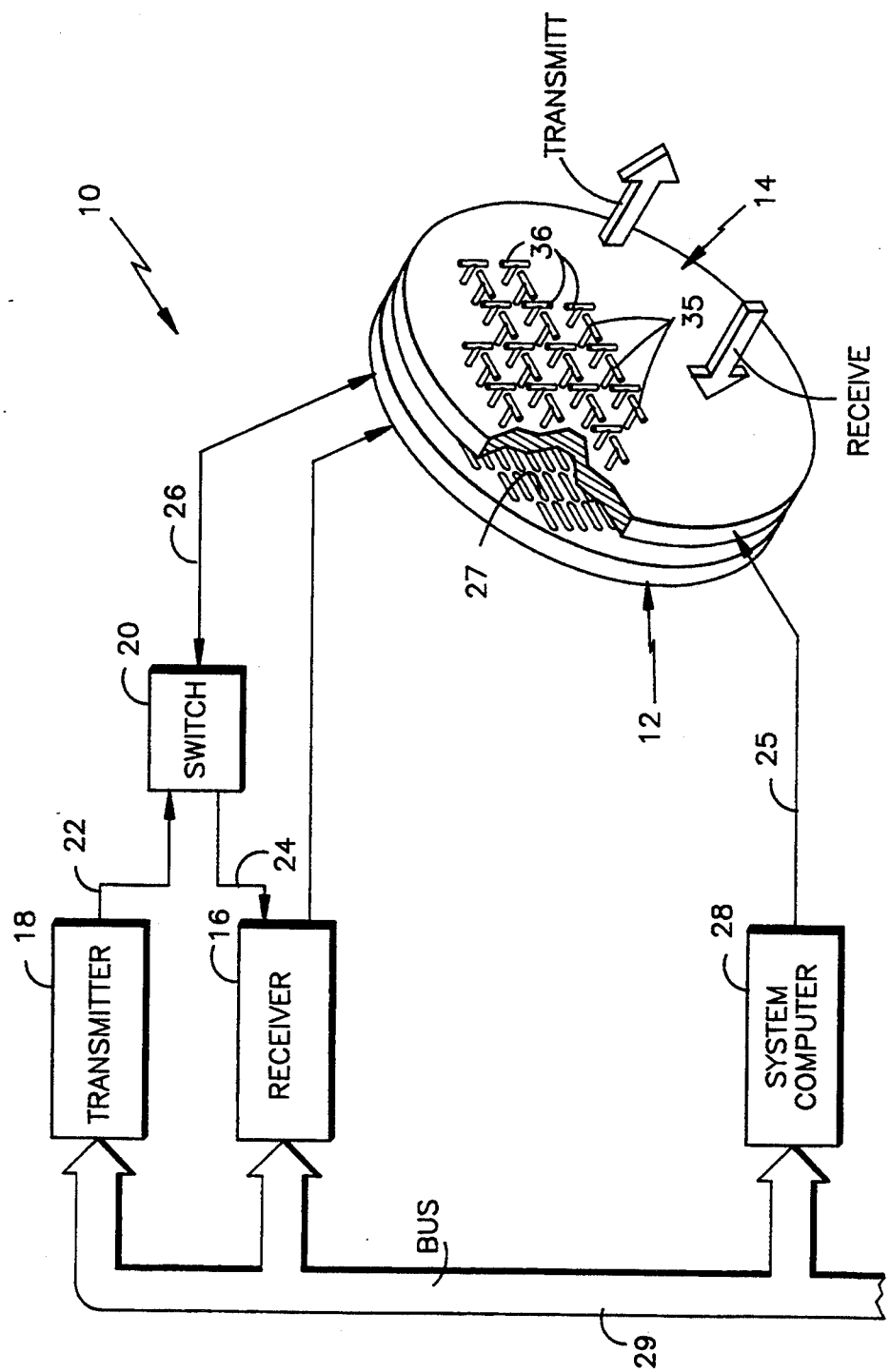
FIG. 1 illustrates a polarization diverse radar system according to the present invention.

Referring to FIG. 1, a polarization diverse radar system 10 includes a source antenna 12 and a lens aperture 14 along with a receiver 16, a transmitter 18 and a transmit/receive switch 20 (e.g., a circulator). The receiver 16 and transmitter 18 operate in a well known manner and transmit and receive signals on lines 22,24 respectfully which are routed to and from the source antenna 12 via the switch 20. An RF transmission line 26 (e.g., a waveguide) carries the signals between the switch and the source antenna.

The source antenna 12 includes a plurality of radiators 27 through which electromagnetic waves in the radar frequency range (e.g., 16.5 GHz at Ku band) propagate. As an example, the source antenna may consist of 820 resonant slot radiators (a few of which are shown) with a radial distribution for radiating pattern sidelobe control of the electromagnetic wave. The source antenna radiates a vertically polarized electromagnetic wave which is coupled to the lens aperture. The radar system 10 is controlled by a system computer 28 which communicates with the receiver 16 and transmitter 18 via a digital data bus 29 (e.g., MIL-STD-1553 or ARINC 629). The system computer 28 also communicates with the lens 14 via a signal on a line 25 to control the polarization switching of the lens 14 which will discussed in detail hereinafter.

Figure 2:
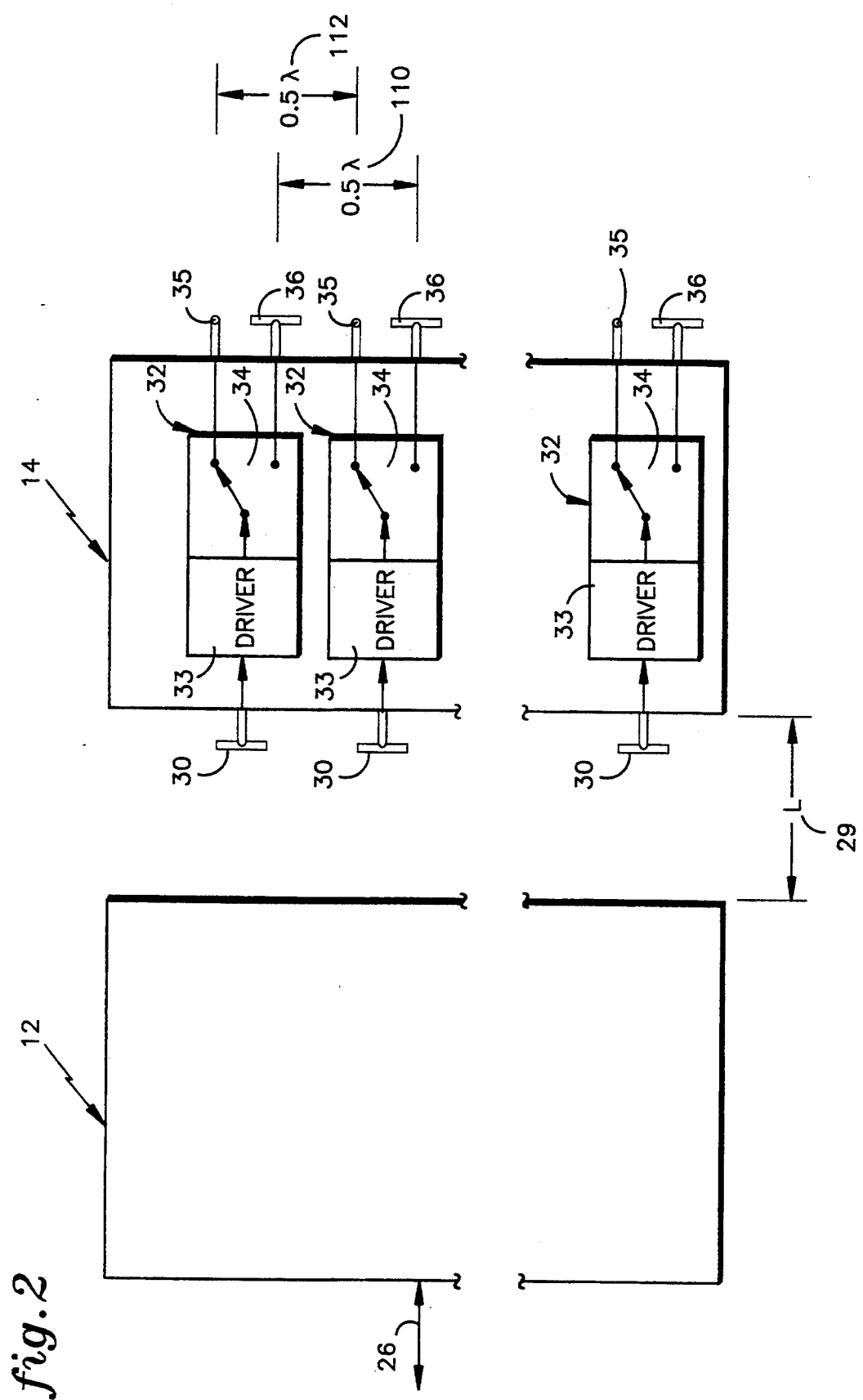
FIG. 2 illustrates a cut-a-way side view of the flat plate array and the lens assembly which comprise the radar system according to FIG. 1.

FIG. 2 illustrates a side view of the source antenna 12 and the lens 14. The source antenna 12 and the lens 14 may be spaced a distance L 29 of 0.1λ to several λ (e.g., 5λ). The preferred spacing is on the order of 0.25λ to 1.0λ. Test data indicates that the best antenna patterns achieved from the present system occur when the spacing is 0.38λ or 0.63λ. At Ku band λ would be in the order of 0.72 inches.

The vertical polarized electromagnetic wave radiated from the source antenna 12 is coupled to the lens 14 via a plurality of coupling elements 30. The electromagnetic wave received at each coupling element 30 (e.g., a simple microstrip dipole element) is input to an associated switching element 32 having an electronic driver circuit 33 and a diode switch 34 and which resides in a lens housing 31 such as aluminum. Each diode switch 34 should be compact, light weight and offer high isolation and low loss. As an example each diode switch may consist of two shunt diodes in each output leg to achieve the isolation necessary (e.g., 30 dB) for cross polarization suppression. Each switching element 32 switches the coupled wave to a horizontal radiating element 35 or a vertical radiating element 36 on a interpulse basis. The switching speed of each switching element 32 is preferably on the order of one to five microseconds at a switching rate of approximately 15 KHz or greater. In an airborne multimode radar system each element should be capable of handling high power, such as, four watts average and sixty watts peak. Attention is drawn to the fact that radiating elements 35,36 may be placed in any orthogonal relationship to one another and as a result the present invention is clearly not limited to only horizontal and vertical alignments on the lens 14. If the electromagnetic wave is radiated from the horizontal radiating element 35 the radiated waveform will have a horizontal polarization, whereas if the waveform is radiated from the vertical radiating element 36 it will have a vertical polarization. During receive mode, the lens 14 can be configured to receive a waveform having either horizontal or vertical polarization. The vertical and horizontal radiating elements 35,36 may be cross wired or printed dipoles, crossed stripline notches, slots or preferably due to simplicity, dual polarized patches. Other candidates include any known radiating elements capable of operating as a high isolation orthogonal radiating element pair.

FIG. 3 is a breakaway front view of the lens array 14 partially illustrating the arrangement of horizontal radiating elements 35 and vertical radiating elements 36. Note, in the interest of clarity in FIG. 2 the horizontal and vertical radiating elements 35,36 associated with the switching diodes are illustrated as the horizontal radiating element being above the vertical radiating element. While in FIG. 3 the horizontal and vertical radiating elements are illustrated in the preferred relationship of being adjacent. However, one of ordinary skill in the art will certainly appreciate that the invention is clearly not so limited, and that in fact there are many different arrangements for the radiating elements which will operate properly.

The present invention is clearly not limited to switching between only horizontally and vertical polarizations. In fact, it is anticipated that the lens can be configured to switch between many different polarizations including: horizontal, vertical, circular and elliptical. FIG. 4 illustrates one such alternative embodiment 49 which incorporates well known phase shift circuitry to provide either a vertical, horizontal, circularly left, circularly right, or an elliptically left or right polarized electromagnetic wave.

Referring to FIG. 4, the source antenna 12 provides a vertically polarized waveform to the coupling elements 30 which provide the coupled waveform to a plurality of phase shifter elements 50. Each phase shifter element 50 includes a power divider 52 (e.g., a 3 dB hybrid) and a variable value multi-bit phase shifter element 54. The dividers 52 split and route the power to both a non-phase shift path 55 and to the phase shifter 54 which provides a variable amount (e.g., 0,22,45,90,135 etc. degrees) of phase shift. These waveforms are then radiated by orthogonally disposed radiating elements 56,58 and combined in space to provide a radiated waveform 60 of the desired polarization.

Figure 5:
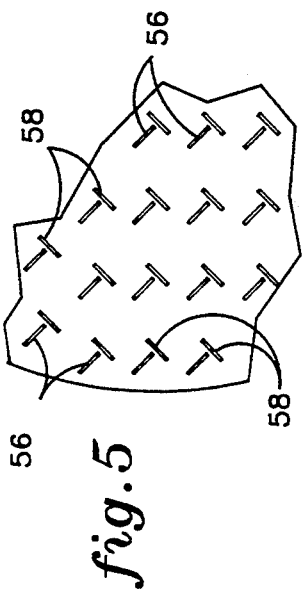
FIG. 5 illustrates a front view of the lens assembly for the alternative embodiment polarization diverse antenna system of FIG. 4.

FIG. 5 illustrates how the orthogonally disposed linear radiating elements 56,58 may be oriented on the face of the lens. Each radiating element 56,58 is inclined 45 degrees to the vertical in order to facilitate the various desired polarizations such as horizontal, vertical, circular or elliptical. An example of the polarization diversity of the present invention is now in order.

Table 1 lists how the phase shifter 54 (FIG. 4) would be commanded to achieve various polarizations assuming the polarization from the source antenna 12 is vertical.

TABLE 1

| RADIATED WAVEFORM 60 POLARIZATION | PHASE SHIFTER #1 |
|---|---|
| Vertical | 180 deg |
| Horizontal | 0 deg |
| Circular left | 90 deg |
| Circular right | 270 deg |
| Elliptical left | 22 deg |
| Elliptical right | 338 deg |

As an example, if the desired polarization of the radiated electromagnetic waveform 60 (FIG. 5) is vertical, the phase shifters 54 will be commanded to 180 degrees of phase shift to provide the vertically polarized radiated waveform. Another example shown in Table 1 discloses that if circular left polarization is desired, the phase shifter is commanded to ninety degrees of phase shift. The remaining phase shifter commands necessary to achieve the other polarizations presented in Table 1 are self explanatory.

In situations where a balanced structure and higher isolation is required a phase shifter may be required in both paths from the power splitter 52 in which case the commands to the phase shifters to achieve the various polarizations may be as illustrated in Table 2.

TABLE 2

| RADIATED WAVEFORM 60 POLARIZATION | SHIFTER #1 | SHIFTER #2 |
|---|---|---|
| Vertical | −90 deg | 90 deg |
| Horizontal | 0 deg | 0 deg |

TABLE 2-continued

| RADIATED WAVEFORM POLARIZATION | SHIFTER #1 | SHIFTER #2 |
|---|---|---|
| Circular left | +45 deg | −45 deg |
| Circular right | −45 deg | +45 deg |
| Elliptical left | +11 deg | −11 deg |
| Elliptical right | −11 deg | +11 deg |

An example illustrating the polarization diversity switching on a pulse to pulse basis of the present invention is now in order.

Figure 6:
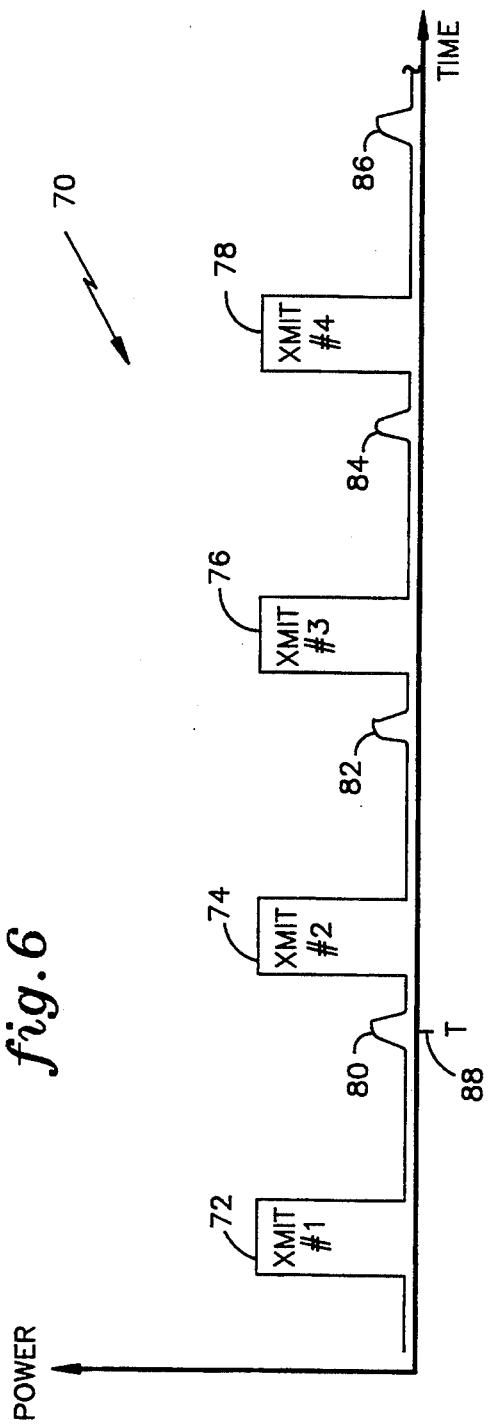
FIG. 6 is a plot of a series of electromagnetic pulses which are radiated from and received by the lens.

FIG. 6 illustrates a series of electromagnetic pulses 70 which are radiated from and received by the lens 14. Power is plotted along the vertical axis and time along the horizontal axis. The series of pulses 70 includes a plurality of transmit pulse 72,74,76,78 and a plurality of receive pulses 80,82,84,86 which represent the reflected return from the target associated with transmit pulses 72,74,76,78 respectfully. As an example of the polarization diversity of the present invention, the first transmit pulse 72 may have a vertical polarization and the second transmit pulse 74 may have circular left polarization. The third transmit pulse 76 may have a circular right polarization followed by a fourth transmit pulse 78 having an elliptical left polarization. Any combination of transmit pulse polarizations is possible.

It should also be understood that the present invention is not limited to receiving only a pulse of the same polarization as the last radiated transmit pulse. As an example, even though the first transmit pulse 72 has a vertical polarization, the radar system 10 is not constrained to receive only a pulse having a vertical polarization at time T 88. One of the features of the system 10 is that is can change the polarization of the signal it receives return pulse to return pulse. That is, the lens 14 can be configured to receive any polarization during receive mode independent of the polarization of the last transmitted pulse.

To achieve complete polarization diversity for both transmit and receive pulses, each switching element must be capable of switching at a rate at least two times greater than the pulse repetition frequency (PRF) of the transmit signal.

Figure 7:
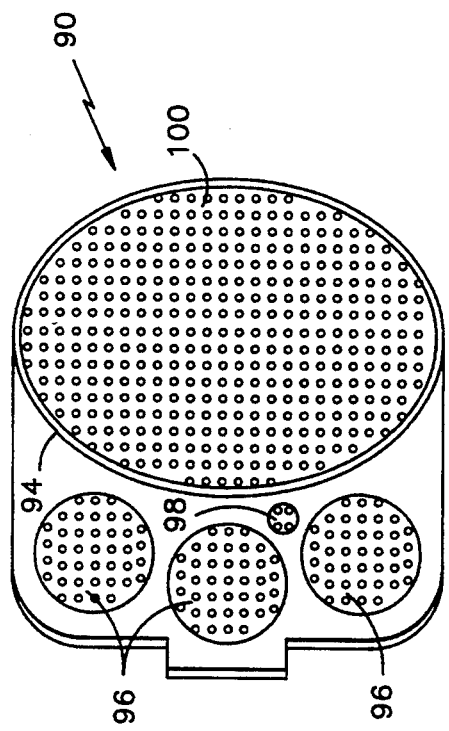
FIG. 7 illustrates another alternative embodiment of a polarization diverse antenna system having a flat plate source antenna which includes several apertures such as a monopulse aperture, a tri-aperture interferometer, and a guard aperture.

The present invention is clearly not limited to antennas having only a monopulse aperture. FIG. 7 illustrates an alternative embodiment polarization diverse radar antenna system 90 of the present invention including a flat plate antenna 92 having several apertures such as a monopulse aperture 94, a tri-aperture interferometer 96, and a guard aperture 98. A polarization switching lens 100 according to the present invention may be placed over only the monopulse aperture 94 as shown in a spaced relationship as discussed hereinbefore.

The present invention is also applicable to an electronically steerable phased array antenna. Switching elements can be placed in front of each of the source antenna's elements to control the polarization of the radiated and received waveforms. The antenna can be entirely electronically scanned or scanned electronically in one dimension and mechanically scanned in the other dimension. It should be noted with a phased array antenna system that the spacing of the radiating elements on the lens should be about one-half a wavelength (i.e., 0.5λ) as shown by distances 110,112 in FIG. 2. An example of a phased array antenna that may incorporate the present invention is the Joint Surveillance Tactical Radar System (JSTARS) manufactured by Norden Systems Incorporated of Norwalk, Conn., a subsidiary of United Technologies Corporation the assignee of the present invention. The polarization diversity switching provided by the present invention can benefit any radar systems working in synthetic aperture radar (SAR) mode, moving target indicator (MTI) mode, or other well known radar operating modes such as a foliage penetration mode.

The present invention is not limited to the embodiments illustrated herein. As an example referring to FIG. 2, clearly the drivers 33 do not have to be collocated with each switching diode 32. Instead, several driver blocks each capable of switching many switching diodes (e.g., forty) may be used depending on factors such as space available in the lens, cooling etc. In addition the present invention is certainly not limited to systems using switching diodes, ferrite switches are a well known alternative amongst others.

The coupling elements generically discussed herein can be septum polarizer, orthomode transducers, patches, notches, probe fed slots, open end waveguide or dipoles. Coupling elements are well known in the art.

An advantage of the present invention is that each transmit pulse may take on any polarization which the lens is capable of providing independent of the polarization of the previous transmit pulse. Similarly, during receive mode the lens can be set up to allow the radar system to receive a return signal of any polarization independent of the polarization of its associated transmit signal.

Although the present invention has been shown and described with respect to a preferred embodiment thereof, it should be understood by those skilled in the art that various other changes, omissions, and additions may be made to the embodiments disclosed herein, without departing from the spirit and scope of the present invention.

I claim:

1. A fast switching polarization diverse radar system, comprising:
    a radar transmitter;
    a radar receiver;
    a transmit and receive antenna which radiates electromagnetic energy of wavelength λ received from said radar transmitter during transmit mode and receives electromagnetic energy during receive mode and routes the received energy to said radar receiver;
    a variable polarization lens placed over the aperture of said transmit and receive antenna at a certain distance from said transmit and receive antenna, comprising
        a) means for coupling said radiated electromagnetic energy to said lens and for providing a coupled electromagnetic energy signal;
        b) means for transforming the polarization of said coupled electromagnetic energy signal as commanded to either horizontal, vertical, circular left, circular right, elliptical left or elliptical right polarization, and for providing a variably polarized electromagnetic waveform having the commanded polarization; and
        c) means for radiating said variably polarized electromagnetic waveform from said lens and receiving a return signal at said lens.

2. A radar system according to claim 1 wherein said means for radiating comprises a plurality of orthogonal radiating element pairs, wherein each of said pairs has a first radiating element and a second radiating element which are orthogonally disposed with respect to each other.

3. The radar system according to claim 2 wherein said transmit and receive antenna and said lens are spaced said certain distance of about $0.1\lambda$ to about $5\lambda$.

4. The radar system according to claim 3 wherein said means for transforming comprises a plurality of diode switches.

5. The radar system of according to claim 3 wherein said means for transforming comprises a plurality of multi-bit phase shifters.

6. The radar system according claim 3 wherein said means for coupling comprises a plurality of dipoles.

7. The radar system according to claim 3 wherein said means for coupling comprises a plurality of probe fed slots.

8. A fast switching polarization diverse antenna system for a radar, comprising:
   a transmit and receive source antenna which transmits a polarized electromagnetic waveform of wavelength $\lambda$ and receives a return signal electromagnetic waveform;
   a fast switching polarization diverse lens which is placed across the aperture of said transmit and receive antenna a fixed distance from said aperture, said lens comprising
   a) a plurality of coupling elements each disposed to receive said polarized electromagnetic waveform and provide a coupled electromagnetic waveform signal;
   b) a plurality of elements each for transforming the polarization of said coupled electromagnetic waveforms signals as commanded to either horizontal, vertical, circular left, circular right, elliptical left or elliptical right polarization, and each for providing a variably polarized electromagnetic waveform; and
   c) a plurality of radiating elements which each receive said variably polarized electromagnetic waveform and radiate said variably polarized electromagnetic waveform via high isolation orthogonally disposed radiating element pairs.

* * * * *